United States Patent Office 2,932,654
Patented Apr. 12, 1960

2,932,654
METHOD OF REDUCING AN UNSATURATED COMPOUND WITH AN ALKALINE OR ALKALINE-EARTH METAL IN LIQUID AMMONIA

Pieter Westerhof, Weesp, Netherlands, assignor to North American Philips Company, Inc., New York, N.Y., a corporation of Delaware No Drawing. Application March 5, 1957
Serial No. 643,942

Claims priority, application Netherlands March 6, 1956

10 Claims. (Cl. 260—397.2)

It is known that compounds of different kinds can react with alkaline metals under quite different reaction conditions. Attention has been paid inter alia to the reaction between alkaline metals and hydrocarbons, for example to the reaction between lithium or sodium and benzene or naphthalene. These reactions have often been carried out in the presence of solvents, for example dimethyl ether. In these cases it was important that the reaction components should not react with the solvent and form irreversible products. With these reactions, lithium- or sodium-addition products of benzene or naphthalene would be formed, which are capable of reacting with carbon dioxide, thus forming carboxy-compounds of benzene or naphthalene respectively.

The reaction between an aromatic hydrocarbon and an alkaline metal has been carried out in a milieu of liquid ammonia. This has proved that the reaction product can be decomposed and form partially reduced, aromatic compounds. It has, for example, been found that from sodium and benzene, dihydrobenzene, from sodium and naphthalene, 1,4-dihydronaphthalene was produced. The compound formed by the reaction between the alkaline metal and the aromatic hydrocarbons being decomposed by means of a compound which, together with sodium dissolved in liquid ammonia, is capable of producing hydrogen without the use of a catalyst in the solution, this dissociating agent not reacting with ammonia under these conditions to form an ammonia salt. Examples of such dissociating agents are: alcohol, water, acid amides, for example formamide or urea, furthermore aromatic amines such as aniline and, moreover, alkyl-mercaptanes and aliphatic aldehydes.

The reduction by means of a solution of an alkaline metal in liquid ammonia has also been applied to unsaturated, aliphatic hydrocarbons. Thus butene is obtained from butadiene and 2-methyl-2-butene from isoprene. With the reduction of alloocimene

with sodium in liquid ammonia 2,6-dimethyl-3,5-octadiene was obtained. Experimentally it was furthermore found that simple unsaturated hydrocarbons were not reduced by alkaline metals in liquid ammonia.

It is furthermore known that with the treatment of Δ⁸⁽⁹⁾-11-ketosteroid, particularly of Δ⁸⁽⁹⁾-22-isoallospirostene-3-β-ol-11-on and/or esters thereof with lithium or sodium in liquid ammonia in the presence of a lower aliphatic alcohol, the double bond between the carbon atoms 8 and 9 is reduced and, moreover, the ketooxygen atom at the carbon atom 11.

The invention relates to a method of reducing an organic compound by means of an alkali or alkaline-earth metal and is characterized in that a solution of the compound of the general formula:

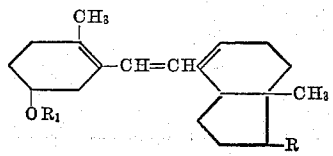   (Formula I)

wherein $R_1$ designates a radical selected from the group consisting of hydrogen, aliphatic acyl radicals and aromatic radicals and R designates a radical selected from the group consisting of saturated and unsaturated aliphatic hydrocarbon radicals, is caused to react with an alkali metal or an alkaline-earth metal, and with a compound selected from the group consisting of ammonia, primary amines and secondary amines, the reaction product obtained being then decomposed, if necessary saponified and/or purified to obtain a compound of the general formula:

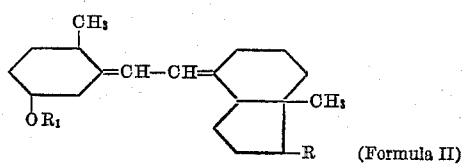   (Formula II)

The reaction may be carried out both by means of the free alcohol and by means of the esters thereof. In the latter case the starting material may be the acetate, propionate, butyrate, orthonitrobenzoate or 3.5-dinitrobenzoate esters.

The group R may be branched or unbranched, saturated or unsaturated.

R designates for example the side chain occurring for example in cholesterol, ergosterol, stigmasterol, α, β and γ-sitosterol.

The presence or double bonds in the group R, these bonds being, as the case may be, conjugated, does not disturb the reduction reaction per se. It is desirable, however, in such a case, that with the reduction also one or more double bonds should be reduced in the unsaturated side chain, i.e. by providing an additional quantity of reducing agent, which is consumed for the reduction of the side chain. The starting substances may occur in different stereoisomeric forms. If R denotes the side chain of cholesterol, the starting substances may be, for example, precholecalciferol or tachysterol₃. However, if R denotes the side chain of ergosterol, the starting substances may be pre-ergocalciferol or tachysterol₂. When the invention was realized, it was not found that a difference in isomeric condition brings about fundamental differences in the reduction.

Of the metals suitable for carrying out the reaction may be mentioned inter alia: lithium, sodium, potassium and calcium.

Of the compounds $NHQ_1Q_2$, by which the reduction can be carried out, we may mention particularly ammonia and secondary amines. Also primary amines may be used to perform the reaction, although in this case the yields are smaller than with a reaction in ammonia or secondary amines.

Of the primary amines we may mention: methyl, ethyl and propylamine; secondary amines may be diethyl or dimethyl amine and furthermore N-methylaniline, N-ethylaniline and piperidine.

For carrying out the reaction preferably a solution of the compound to be reduced is added to a mixture of alkali or alkaline-earth metals and ammonia (or a primary or secondary amine). If desired, the mixture of metal and ammonia or amine may be added to the solution of the compound to be reduced.

For the sake of completeness it may be noted that to the mixture of alkali or alkaline-earth metal and ammonia (or a primary or secondary amine) may be added a solution in which the compound to be reduced is soluble.

The solvent for the compound to be reduced is preferably a liquid which does not react with the reaction components in an irreversible manner. The use of solvents capable of reacting with the metal to form hydrogen in statu nascendi is not desired, since thus unwanted reductions may take place. For this reason it is not advisable to use uni- or multivalent aliphatic alcohols, for example ethanol, propanol, 2-methyl butanol-2 or ethylene glycol as solvents. It should, however, be noted that the reduction may be carried out without any objection in an atmosphere of hydrogen gas. Suitable solvents are, for example, many mono- and di-ethers, for example, dimethyl-, diethyl-, methylethyl-, or methylbutyl-ether, dioxane and furthermore aliphatic esters of glycol, for example, dimethyl- or diethyl-glycol. Use may furthermore be made of aliphatic hydrocarbons, for example, n-hexane or n-heptane. Also alicyclic or aromatic hydrocarbons may be used, for example, cyclohexane, benzene and toluene. If the reaction is carried out in liquid ammonia, it is advantageous that the solution of the compound to be reduced does not solidify wholly or partly by crystallisation of the solvent or a mixture thereof. This may occur, when certain alicyclic or aromatic hydrocarbons are used as solvents, since the melting point of these liquids may be rather high with respect to the temperature at which ammonia is still liquid. These liquids are therefore mixed preferably with the aforesaid ethers, so that a mixture may be obtained which is not frozen out at the temperature at which ammonia is liquid. The reduction in liquid ammonia is preferably carried out in a homogeneous system. It should be noted here that not all of the aforesaid solvents or mixtures thereof can be mixed with liquid ammonia in any ratio. For example, a solution of 75 mls. of liquid ammonia and 85 mls. of diethylether is demixed, when cooled to about —40° C. By a simple experiment it may be stated with what ratio ammonia forms a homogeneous solution with the formed solvents. The reduction in a milieu of liquid ammonia may be carried out both with a predetermined quantity of metal or with an excess quantity thereof. However, the first method is preferred.

With the reduction in a milieu of primary amines it is important that no larger quantity of metal should be added to the mixture to be reduced than is required for the reduction of one double bond of the conjugated system of double bonds in Formula I. It has been found that, when adding larger quantities further reductions occur, in which the other double bonds lying between the rings are partly reduced. If the side chain R has one or more double bonds, the additional quantity of metal required for it may be added to the mixture to be reduced.

The solubility of the metals for carrying out the reduction in secondary amines is rather low. The reduction by means of these amines is therefore usually carried out in a heterogeneous system with a large excess quantity of the metal.

It has been found that the reaction by means of these amines must be carried out in the presence of an etheric solvent. For this purpose the same mono- and di-ethers may be used, which are mentioned above.

The reactivity of the metal may be enhanced in a milieu of a secondary amine by etching the surface of the particles, for example, by means of chlorobenzene or by damaging it mechanically, for example, by carrying out the reaction by stirring vigourously, if required, in the presence of glass splinters. The temperature of a reaction in secondary amines may be fairly high, so that the reaction can be carried out at the boiling temperature of the reaction agent. The reaction in this milieu is carried out preferably at temperatures between 0° C. and 120° C., for example between 10° C. and 30° C.

The reaction mixture contains various chemically reactive components, which may readily give rise to unwanted reactions. For example, the compounds to be reduced and the metals are very sensitive to oxidation; lithium forms readily nitrides in air and moisture causes the metals to form oxides and/or hydroxides. It is therefore important to carry out the reaction with the exclusion of oxygen and moisture and, if lithium is used, the presence of nitrogen should be avoided. The reaction between the metal and the compound to be reduced must be followed by a decomposition, after which the reduced compound to be formed is obtained. The decomposition may be obtained by means of a compound capable of replacing an alkaline metal in an alkyl-alkaline compound by a hydrogen atom, for example, the compounds capable of converting methyl- or ethyl-sodium or lithium into methane or ethane respectively. Such decomposing agents are, for example, water, lower aliphatic alcohols, for example, methanol, ethanol, propanol, 2-methylbutanol-2 or multivalent alcohols, for example, ethylene- or propylene-glycol. The decomposition may, as an alternative, be carried out by means of ammonium salts of strong inorganic acids, for example, ammonium iodide, ammonium bromide, ammonium chloride, ammonium nitrate or ammonium sulfate.

In order to avoid the formation of hydrogen in statu nascendi during the decomposition, it is desirable that the reaction mixture should not contain an excess quantity of metal. This may be achieved by carrying out the reaction between the metal and the compound to be reduced by means of a predetermined quantity of metal, which is readily calculated, when the reaction takes place in liquid ammonia or in lower primary aliphatic amines or by removing the excess of metal before the metal addition product is decomposed. The latter may, for example, be achieved by oxidizing the excess quantity of metal; for this purpose use may be made of the potassium, sodium and ammonium salts of nitrates, bromates and iodates. As an alternative, the excess quantity of metal, if it is unsoluble, which is usually the case when the reaction is carried out in secondary amines, may be removed mechanically, for example, by means of tweezers.

By measuring the ultraviolet absorption spectrum of the reaction mixture, it can be stated in many cases whether and in approximately what quantity the reduced compound is formed. Many compounds of the formula:

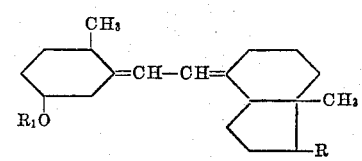

are characterized by an ultraviolet absorption spectrum having maxima at 242, 251, 261 m$\mu$ (the associated E-values are about 34,500, 40,000 and 25,800). From the $E_{1\,cm}^{1\%}$-values of the pure compounds and the $E_{1\,cm}^{1\%}$-values of the impure compounds obtained by the method according to the invention may be calculated the concentration of the latter compounds in the reaction product. The $E_{1\,cm}^{1\%}$-values of dihydrotachysterol$_2$ and dihydro tachysterol$_3$ at a wavelength of 251 m$\mu$ are 1002 and 1012 respectively. The concentration of these compounds in percents in the reaction products is approximately found by dividing the $E_{1\,cm}^{1\%}$-values (for a wavelength of 251 m$\mu$) by 10. If the group R$_1$ or R have their own absorptions in the ultraviolet, which is for example the case, if R$_1$ designates a benzoate- or a nitrobenzoyl-group, or if R contains a conjugated system of double bonds, the spectrum of these compounds may exhibit other maxima than those mentioned above.

The reduced compounds may be isolated from the crude reaction mixtures by methods corresponding, in principle, with those used for separating out dihydrotachysterol₂ from the reaction mixture of ergocalciferol or tachysterol₂ with an alkaline metal and an aliphatic uni- or multivalent alcohol.

For example, the known reduction mixture may be freed from unwanted by-products and impurities by chromatographic methods. As an alternative, from the reduced compound an ester of a lower aliphatic fatty acid, may be formed which can be fairly readily separated out and purified by crystallisation. By a third method first the unwanted by-products obtained from the reduction reaction are converted into a readily crystallisable ester, for example, the dinitrobenzoic acid ester or the allophane acid ester, the crystals being separated out and the residue being worked up further to obtain the desired compound. Finally it has been suggested to combine two or more of these methods. For example, for isolating dihydrotachysterol₂ it has been suggested to convert the reaction mixture into an ester of a lower aliphatic fatty acid, the impurities being chromatographically expelled before or after esterification or saponification.

These methods of purifying may also be used to separate out a compound of the formula:

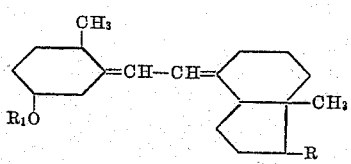

from a reduction mixture obtained in accordance with the invention. After the decomposition the reduced compound may be separated out by methods known for the production of dihydro-tachysterol₂. The invention is particularly important for the reduction of preergocalciferol and precholecalciferol and of tachysterol₂ and tachysterol₃ to obtain dihydrotachysterol₂ and dihydrotachysterol₃ respectively. The preergo- and precholecalciferols, which may be represented by the following formula:

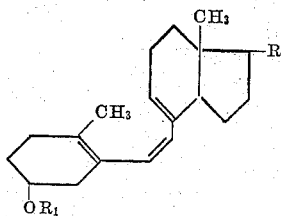

(wherein $R_1$ has the aforesaid meaning and R designates the side chain of ergosterol and cholesterol respectively) may be produced by a method published by Velluz in "Bulletin Soc. Chim.," 1949, page 501. With the reduction according to the invention the starting substance may either be the pure preergo- or precholecalciferol or the crude products obtained by Velluz method.

When realizing the invention it has furthermore been found that with the reduction of preergo- or precholecalciferol in a milieu of ammonia approximately the same yields are obtained as in a milieu of a secondary amine as, for example, di-ethylamine or N-methylaniline. The reduction of preergo- or precholecalciferol by means of a metal in a secondary amine or in a primary amine, in which the metal is not dissolved, is carried out preferably at a fairly low temperature, i.e. at about 60°, since these compounds are isomerized under the action of heat. A temperature between 10 and 30° C. is advisable. The reduction in ammonia by means of lithium or calcium applied to precholecalciferol produced better yields than the corresponding reductions by means of sodium. It has furthermore been found to be advantageous that the reduction of preergo- or precholecalciferol in liquid ammonia is carried out with a predetermined quantity of metal.

The yields of the reductions of tachysterol₂ and tachysterol₃ in accordance with the method of the invention in a milieu of ammonia were approximately the same as those of the corresponding reductions by means of secondary amines, for example, di-ethylamine or n-methylaniline. It is advantageous to carry out the reduction by means of lithium in liquid ammonia and the reduction by means of sodium in a secondary amine. Under these conditions favourable yields are obtained. For the production of dihydrotachysterol₂ or dihydrotachysterol₃ by the method according to the invention the starting substance is preferably tachysterol₂ or tachysterol₃ respectively. The yield of this reaction exceeds that of the corresponding reduction of preergo- or cholecalciferol.

Example I

In a bulb having an agitator and a dripping funnel ammonia gas (after having been dried in two columns filled with grains of potassium hydroxide) was condensed by cooling with a carbon dioxide ice-alcohol mixture until 250 mls. of liquid ammonia was obtained, and 100 mls. of absolute diethyl ether were then added. By passing over a flow of ammonia gas and by excluding moisture, and by dissolving a piece of lithium, the reaction mixture is checked to see if it is free from moisture. If the colour remains blue, 500 mgs. of lithium is then dissolved in the mixture by stirring it vigourously for 15 minutes at a temperature of about —60 to —50° C. Then a solution of 4 gs. of tachysterol₂ in 100 mls. of absolute diethyl ether was rapidly added to the reaction mixture and stirring was continued for another five minutes. The mixture was decomposed by adding 1 to 2 gs. of ammonium chloride, the mixture being thus decoloured after some time. By careful dilution with water and extraction with diethyl ether, after vigorous washing with distilled water, an etheric solution is obtained, which yields a fairly colourless resin, after drying on anhydrous sodium sulphate, filtering and distilling off the solvent. The ultraviolet absorption spectrum exhibits the maxima characteristic of dihydro-tachysterol₂ at 242.5, 251 and 260.5 m$\mu$.

$$E^{1\%}_{1\,cm.} (251\ m\mu) = 405$$

Paper-chromatographic examination proved that apart from dihydro-tachysterol₂ none of the known dihydro-derivatives, for example, dihydro-vitamin D₂ I and II are present. By means of an infrared measurement the content of dihydro-tachysterol₂ could be fixed at about 38%.

7 gs. of the reduction product was chromatographed through 91 gs. of Al₂O₃ (standardized in accordance with Brockmann), the substance being introduced into the column in 100 mls. of petroleum ether (at 40 to 50° C.). The solvent had been purified by shaking with concentrated sulphuric acid. After elution with 1000 mls. of petroleum ether 1.92 gs. of a substance was obtained, which, according to the ultraviolet absorption spectrum, consisted of pure dihydrotachysterol₂ by 90% (melting point 120 to 127° C.). The substance was dissolved in 12 mls. of dry pyridine and to the solution was added 4 mls. of acetic acid anhydride. By extraction with diethyl ether and crystallisation from methanol 1.36 gs. of dihydrotachysterol₂ acetate is obtained; melting point 109 to 110° C. By alkaline hydrolysis this yields the pure dihydrotachysterol₂.

Example II

In a bulb having an agitator and a dripping funnel 175 mls. of dry, liquid ammonia was condensed. To the ammonia was added 70 mls. of absolute diethyl ether. By adding a small supply of lithium until the colour remains blue, the mixture is rendered free from water. Then 350 mgs. of lithium was added and, with stirring, dissolved, while a flow of ammonia gas is passed over carefully. A solution of 2.8 gs. of tachysterol₃ in 70 mls. of absolute diethyl ether was then added rapidly, while stirring, through the dripping funnel, to the metal solution; after a further five minutes the reaction mixture was decomposed by means of ammonium chloride and then water. The mixture was extracted by means of diethyl ether and the etheric solution was washed with a diluted sodium chloride solution and then dried and distilled. The residue obtained is a substantially colourless, resin-like amorphous substance, having maxima in the ultra-violet absorption spectrum at 242, 251 and 260 m$\mu$;

$E_{1cm.}^{1\%}$-value (251 m$\mu$) = 502

3.8 gs. of the reduction product obtained was dissolved in 75 mls. of petroleum ether (boiling point 40 to 50° C.). The solution was chromatographed through a column of alumina, standardized according to Brockmann; activity 2–3.

After a first fraction of 150 mls., a second fraction of 250 mls. of liquid was obtained. The second fraction was found to contain 482 mgs. of substance;

$E_{1cm.}^{1\%}$-value (251 m$\mu$) = 997

350 mgs. of this material was dissolved in 7.5 mls. of absolute benzene and 5 mls. of absolute pyridine. To the second solution was added a solution of 350 mgs. of p-phenylazobenzoylchloride in 5 mls. of benzene. The reaction mixture was heated at a temperature between 50–50° C. for four hours, while moisture was excluded. After the addition of 1 ml. of water, the heating is continued at 45° C. for 30 minutes. The reaction mixture was then diluted by a diethyl ether and the solution obtained was washed with an aqueous bicarbonate solution, water, diluted hydrochloric acid, water, an aqueous bicarbonate solution and water. The solution thus obtained was dried and distilled in vacuo. The residue was dissolved in a small supply of absolute benzene and filtered through a column of 4 gs. of neutralized alumina. The benzene of the filtrate was removed in vacuo. The residue was crystallized from a mixture of acetone and methanol (5:4). Yield 352 mgs. of pale orange needles. After recrystallisation from a mixture of acetone and methanol (1:2) the melting point was 107 to 108.5° C.

150 mgs. of the p-phenylazobenzoic acid ester of dihydrotachysterol₃ thus obtained was dissolved in 30 mls. of diethyl ether. The solution was mixed with a solution of 7.2 gs. of potassium hydroxide in 60 mls. of methanol and then refluxed for 30 minutes. The cooled mixture was diluted with water and extracted with diethyl ether. The etheric solution was washed with water, dried and distilled in vacuo. The residue was crystallized from methanol. The colourless needles of dihydro-tachysterol₃ obtained after recrystallisation from methanol and a small quantity of water have a melting point of 101 to 102.5° C. The ultraviolet absorption spectrum has three absorption maxima with extinction values of:

$E_{1cm.}^{1\%}$ (242.5 m$\mu$) 872

$E_{1cm.}^{1\%}$ (251 m$\mu$) 1012

$E_{1cm.}^{1\%}$ (260.5 m$\mu$) 653

The dihydrotachysterol₃ has double the increasing effect on the blood calcareous level of rats compared with dihydro-techysterol₂.

*Example III*

300 mls. of freshly cut sodium was atomized under boiling xylene and after cooling and vigourously washing with absolute diethyl ether introduced into 7 mls. of this solvent. To this mixture was then added a solution of 700 mls. of tachysterol₂ and 970 mgs. of dry, freshly distilled N-methylaniline in 15 mls. of absolute diethyl ether. This mixture was stirred in a nitrogen atmosphere for four hours, while moisture was excluded.

The excess quantity of sodium was removed mechanically, after which the residue was decomposed by means of ethanol. The reducing mixture was washed with 2 N-sulphuric acid, distilled water, an aqueous bicarbonate solution and water.

Drying, filtering and evaporating to dryness yielded a colourless resin, of which the ultraviolet absorption spectrum exhibited the maxima characteristic of dihydrotachysterol₂

($E_{1cm.}^{1\%}$ 251 m$\mu$ = 422)

The paper-chromatographic test confirmed the presence of a large quantity of dihydrotachysterol₂, while no dihydro-vitamin D₂-I or D₂-II was present.

*Example IV*

0.25 g. of freshly cut lithium was introduced into a solution of 1 g. of tachysterol₂ in 25 mls. of dry, freshly distilled diethyl amine and 25 mls. of absolute diethyl ether.

After the addition of two drops of chlorobenzene and a few bits of glass, the mixture is stirred vigorously for two days in a nitrogen atmosphere. The substance was worked up as in Example III and yielded a colourless resin ($E_{1cm.}^{1\%}$ 251 m$\mu$ = 400)

in which the presence of a fairly large quantity of dihydrotachysterol₂ could be proved distinctly by paper-chromatographic test.

*Example V*

Into a mixture of 75 mls. of liquid ammonia and 17 mls. of absolute diethyl ether cooled to −50° C. and contained in a bulb having an agitator and a dripping funnel, there was dissolved 150 mgs. of lithium, with stirring, cooling and the passing over carefully of ammonia gas. After stirring for 10 minutes a solution of 1.6 gs. of preergocalciferol in 35 mls. of absolute diethyl ether was added to this mixture. After stirring for a few minutes the reaction mixture was decomposed by adding 1.5 gs. of ammonia chloride, after which the ammonia and the ether were caused to evaporate in air. The residue was dissolved in diethyl ether, the solution was washed with water, then dried on anhydrous sodium sulphate and finally distilled. The amorphous residue obtained contained, in accordance with the ultraviolet absorption spectrum, after correction of the prevailing unconverted preergocalciferol, 25% dihydrotachysterol₂. A qualitative, paper-chromatographic test confirmed the presence of a large quantity of dihydro-tachysterol₂ and the absence of dihydrovitamin D₂-II.

*Example VI*

0.7 g. of sodium (divided into a powder under xylene) was stirred with 30 mls. of absolute diethyl ether, in which 1 g. of preergocalciferol and 1.4 gs. of N-methylaniline was dissolved, for two hours in a nitrogen atmosphere. After removing mechanically the excess quantity of sodium, the etheric solution was washed with 2 N-sulphuric acid water and an aqueous bicarbonate solution, then dried and subjected to distillation. The spectrum exhibited the maxima characteristic of dihydrotachysterol₂ (243, 251 and 260 m$\mu$);

$E_{1cm.}^{1\%}$ (251 m$\mu$) = 322

The paper-chromatographic test confirmed the presence of a large quantity of dihydro-tachysterol₂ and the absence of dihydro-vitamin D₂-I and D₂-II.

*Example VII*

To a mixture of 75 mls. of liquid ammonia and 50 mls. of absolute diethyl ether, contained in a bulb having an agitator and a dripping funnel, there were added, while the mixture was cooled to −60° C. and while stirring and passing over carefully a flow of ammonia gas, small pieces of calcium until the colour of the mixture remained blue. Then 1.6 gs. of calcium was added to the solution. To the mixture obtained was then added 1 g. of preergocalciferol, dissolved in 35 mls. of absolute diethyl ether. After stirring for five minutes, the reaction mixture was decomposed by adding 0.5 g. of ammonium chloride. After working up as in Example VI, an amorphous substance is obtained, which has the characteristic ultraviolet absorption spectrum of dihydro-tachysterol$_2$;

$$E_{1cm.}^{1\%} (251 \text{ m}\mu) = 301$$

The paper-chromatographic test exhibited a fairly large quantity of dihydro-tachysterol$_2$, while no dihydro-vitamin D$_2$-I and D$_2$-II was present.

*Example VIII*

To a mixture of 75 mls. of liquid ammonia and 50 mls. of absolute diethyl ether at −60 to −50° C., contained in a bulb having an agitator and a dripping funnel, there was dissolved such a quantity of lithium, that the solution just had a blue colour. To this mixture was added 100 mgs. of lithium, after which 0.5 g. of a radiation product of ergosterol, dissolved in 25 mls. of absolute ether and containing about 60 to 70% tachysterol$_2$ was added. After stirring for a few minutes, the reaction mixture was decomposed by adding 1 g. of ammonium chloride. After careful addition of water, the product obtained was worked up as in Example I.

The amorphous substance obtained had the characteristic absorption spectrum of dihydrotachysterol$_2$ with a value $$E_{1cm.}^{1\%} (251 \text{ m}\mu) \text{ of } 370$$

*Example IX*

To a mixture of 75 mls. of dry liquid ammonia and 50 mls. of absolute diethyl ether there were added, while moisture was excluded, bits of freshly cut sodium, until the colour remained blue. Then, while stirring and carefully passing over ammonia gas, 330 mgs. of sodium was added. When the metal had been dissolved, a solution of 0.5 g. of a radiation product containing 60 to 70% of tachysterol$_2$ (obtained by irradiating a solution of ergosterol by light of 254 m$\mu$ and by removing unconverted ergosterol) in 25 mls. of absolute ether was added to the solution. After stirring for five minutes, the reaction mixture was decomposed by adding 1 g. of ammonium chloride. After working up, an amorphous residue was obtained, having the characteristic ultraviolet absorption spectrum of dihydrotachysterol$_2$ $$(E_{1cm.}^{1\%} (251 \text{ m}\mu) = 218)$$

*Example X*

Into a bulb having an agitator were introduced 1 g. of tachysterol$_2$, 15 mls. of anhydrous, freshly cut piperidine, 25 mls. of absolute di-ethyl ether and 0.25 g. of freshly cut bits of sodium. After the addition of a few bits of glass, the mixture is stirred vigourously at room temperature in a nitrogen atmosphere. After stirring for 48 hours, the ultraviolet absorption spectrum proves that a substance having the spectrum characteristic of dihydro-tachysterol$_2$ was obtained $$E_{1cm.}^{1\%} (251 \text{ m}\mu) = 305$$

A paper-chromatographical test confirms distinctly the presence of dihydro-tachysterol$_2$.

*Example XI*

100 mgs. of lithium cut into small bits, was introduced into a bulb containing a solution of 1 g. of tachysterol$_2$ in 10 mls. of absolute diethyl ether and 1.5 gs. of N-methylaniline. The mixture was stirred vigorously at room temperature, while hydrogen gas was passed over and after having added a few splinters of glass. After four hours the reaction mixture was worked up by removing the excess quantity of lithium, adding alcohol and water, washing the etheric solution with diluted acid and distilling. The amorphous residue exhibited the ultraviolet absorption spectrum characteristic of dihydro-tachysterol$_2$.

$$E_{1cm.}^{1\%} (251 \text{ m}\mu) = 298$$

*Example XII*

1 g. of preergocalciferol-3.5-dinitrobenzoate was dissolved in 35 mls. of absolute diethyl ether and added to a mixture of 75 mls. of liquid ammonia and 50 mls. of absolute diethyl ether. While stirring vigorously a solution of lithium in liquid ammonia was dripped into the mixture until the colour was distinctly blue. The excess of lithium was then removed by adding solid sodium nitrate, after which the reaction mixture was decomposed with water. The etheric solution was separated out, washed with water and reduced to a volume of 10 mls. After the addition of a solution of 1 g. of potassium hydroxide in 100 mls. of methanol, the mixture was boiled for 30 minutes on a water bath. After the dilution with water the etheric extract yielded, after washing and drying, an amorphous, dark-coloured product having the ultraviolet spectrum characteristic of dihydro-tachysterol$_2$.

$$E_{1cm.}^{1\%} (251 \text{ m}\mu) \text{ 1 503}$$

*Example XIII*

1 g. of tachysterol$_2$, dissolved in 40 mls. of absolute diethyl ether and 30 mls. of freshly distilled dry aniline were stirred vigorously with 275 mgs. of blank sodium, cut to small pieces, in a nitrogen atmosphere, while moist was excluded, in the presence of bits of glass, for 50 hours.

The decomposition of a sample of the solution with ether washing of the etheric solution with diluted sulphuric acid and a sodium bicarbonate solution, drying and distilling off yielded a residue of which ultraviolet spectrum exhibited that apart from a small quantity of unconverted starting substance dihydro-tachysterol$_2$ was formed.

$$E_{1cm.}^{1\%} (251 \text{ m}\mu) = 302$$

*Example XIV*

To 75 mls. of anhydrous liquid monomethyl amine and 50 mls. of absolute diethyl ether was added such a quantity of a lithium solution in liquid monomethyl amine that the colour of the mixture was just blue. Then a solution of 1 g. of tachysterol$_2$ in 35 mls. of absolute diethyl ether was added to this mixture. Then a solution of 150 mgs. of lithium in 50 mls. of monomethyl amine was added in eight equal quantities. After each addition a sample of the solution is taken, which is worked up by adding water, the etheric extract was washed with water, dried, filtered and evaporated, and the residue was tested by spectro-photometrical means. After the fourth up to and including the sixth addition the amorphous residue of the samples exhibited distinctly the ultraviolet maxima of dihydro-tachysterol$_2$. Further addition of the lithium solution reduces the content of dihydrotachysterol$_2$.

To a mixture of 75 mls. of liquid ammonia and 50 mls. of absolute diethyl ether, contained in a bulb excluded from moist, was added a solution of lithium in ammonia in drops until the colour of the solution was just blue. Whilst dry ammonia gas was passed over, a solution of 300 mgs. of tachysterol$_2$-acetate, produced from tachysterol$_2$ by acetylisation by means of acetyl chloride and pyridine at 0° C., in 25 mls. of absolute diethyl ether was added to the mixture.

Then such a quantity of the lithium solution in ammonia was added in drops that the colour was again just blue.

To this mixture was added carefully water, after which the etheric solution was washed with water, then dried and distilled, after which the residue was hydrolysed by means of methanolic potassium lye. After extracting the saponifying agent by means of diethyl ether, the etheric solution was washed with water, dried and distilled. The residue had the absorption spectrum characteristic of dihydro-tachysterol$_2$ with a value $E_{1cm.}^{1\%}$ (251 m$\mu$) of 354

What is claimed is:

1. A method of producing dihydro derivatives of steroids selected from the group consisting of preergocalciferol, precholecalciferol, tachysterol$_2$ and tachysterol$_3$ comprising the steps of dissolving a compound selected from the group consisting of one of said steroids and the aliphatic and aromatic esters thereof in a solvent selected from the group consisting of the lower aliphatic ethers, dioxane, lower aliphatic esters of glycol, n-butane, petroleum ether, n-hexane, n-heptane, cyclohexane, benzene and toluene and mixtures of said solvents, mixing the resultant solution with a mixture of a metal selected from the group consisting of the alkali metals and the alkaline earth metals and a liquid amine selected from the group consisting of liquid ammonia, lower alkyl secondary amines, lower alkyl primary amines, and piperidine, keeping the resultant reaction mixture free of moisture, atmospheric oxygen and hydrogen in statu nascendi and keeping the temperature of said reaction mixture between about 0° C. and 120° C., adding to the reaction mixture a compound selected from the group consisting of water, lower aliphatic monohydric alcohols, lower aliphatic dihydric alcohols and ammonium salts of strong inorganic acids and separating out the resultant dihydro derivative.

2. The method of claim 1 in which liquid ammonia is used, a stoichiometric amount of the metal is used and the reactants form a homogeneous system.

3. The method of claim 1 in which the liquid ammonia is employed, an excess amount of the metal is employed which amount is decomposed after the completion of the reaction by treatment with an oxidizing agent selected from the group consisting of sodium, potassium and ammonium salts of nitric, perchloric, perbromic and periodic acids.

4. The method of claim 1 in which a lower aliphatic primary amine is used and the metal is used in a stoichiometric amount.

5. The method of claim 1 in which the liquid amine compound is an N alkyl substituted aniline, the solvent is a lower aliphatic ether, and the surface of the metal employed is activated, an excess of said metal being employed which excess is removed mechanically after the completion of the reaction between the steroid and the metal.

6. The method of claim 1 in which the compound produced by reduction is purified by chromatographic means after removal of all inorganic compounds.

7. The method of claim 1 in which the compound produced by reduction is converted to an ester of a lower aliphatic carboxylic acid selected from the group consisting of acetic acid and propionic acid, this ester being then separated out by crystallization.

8. The method of claim 1 in which the organic compounds formed as by-products of the reaction are converted to a readily crystallizable ester selected from the group consisting of the 3,5-dihydrobenzoic ester, the allophane acid ester and the phenylozobenzoic acid ester and this tester is separated out by crystallization.

9. A method of producing dihydro derivatives of steroids selected from the group consisting of preergocalciferol, precholecalciferol, tachysterol$_2$ and tachysterol$_3$ comprising the steps of dissolving a compound selected from the group consisting of one of said steroids and the aliphatic and aromatic esters thereof in a lower aliphatic ether, mixing the resultant solution with a mixture of an alkali metal and a liquid lower alkyl secondary amine, keeping the resultant reaction mixture free of moisture, atmospheric oxygen and hydrogen in statu nascendi and keeping the temperature of said reaction mixture between about 15° C. to 30° C., adding to the reaction mixture a compound selected from the group consisting of water, lower aliphatic monohydric alcohols, lower aliphatic dihydric alcohols and ammonium salts of strong inorganic acids and separating out the resultant dihydro derivative.

10. A method of producing dihydro derivatives of steroids selected from the group consisting of preergocalciferol, precholecalciferol, tachysterol$_2$ and tachysterol$_3$ comprising the steps of dissolving a compound selected from the group consisting of one of said steroids and the aliphatic and aromatic esters thereof in a lower aliphatic ether, mixing the resultant solution with a mixture of lithium and liquid ammonia, keeping the resultant reaction mixture free of moisture, atmospheric oxygen and hydrogen in statu nascendi and keeping the temperature of said reaction mixture between about 15° C. to 30° C., adding to the reaction mixture a compound selected from the group consisting of water, lower aliphatic monohydric alcohols, lower aliphatic dihydric alcohols and ammonium salts of strong inorganic acids and separating out the resultant dihydro derivative.

References Cited in the file of this patent

UNITED STATES PATENTS

| | | |
|---|---|---|
| 2,228,491 | Werder | Jan. 14, 1941 |
| 2,840,575 | Koevoet et al. | June 24, 1958 |
| 2,862,934 | Koevoet et al. | Dec. 2, 1958 |

FOREIGN PATENTS

| | | |
|---|---|---|
| 624,231 | Germany | Jan. 15, 1936 |
| 58,764 | Netherlands | Jan. 15, 1947 |
| 1,004,896 | France | Dec. 5, 1951 |

OTHER REFERENCES

Gilman: "Organic Chemistry," vol. I, p. 528, J. Wiley (1943).